United States Patent [19]

Imamura et al.

[11] Patent Number: 4,915,844
[45] Date of Patent: Apr. 10, 1990

[54] LIQUID-SOLID PARTICLE SEPARATION PROCESS

[75] Inventors: Yuko Imamura; Hiroshi Matsuno, both of Osaka, Japan

[73] Assignee: Nitto Denko Corporation, Osaka, Japan

[21] Appl. No.: 316,000

[22] Filed: Feb. 27, 1989

[30] Foreign Application Priority Data

Feb. 25, 1988 [JP] Japan .................................. 63-43349

[51] Int. Cl.⁴ .............................................. B01D 13/00
[52] U.S. Cl. ..................................... 210/651; 210/259
[58] Field of Search ............... 210/651, 652, 295, 263, 210/257.2, 259, 650

[56] References Cited

U.S. PATENT DOCUMENTS 4,592,768  6/1986  Cutler et al. ..................... 210/295 X
4,812,237  3/1989  Cawley et al. .................. 210/652 X Primary Examiner—Frank Spear
Attorney, Agent, or Firm—Sughrue, Mion, Zinn, Macpeak & Seas

[57] ABSTRACT

A liquid-solid particle sepation process is disclosed, which is characterized by comprising the repetition of feeding waste solution containing fine solid particles to a membrane-type separator and feeding at least part of the solution concentrated with particles therefrom back to the membrane-type separator on one hand while providing the concentrated solution to a centrifugal separator on the other. The process exhibits that the permeability of the membrane can be kept almost as good as in the beginning of filtering operation.

4 Claims, 1 Drawing Sheet

LIQUID-SOLID PARTICLE SEPARATION PROCESS

FIELD OF THE INVENTION

This invention relates to a process for treating solution containing fine solid particles of submicron orders.

BACKGROUND OF THE INVENTION

In cutting and polishing silicon wafers, there form fine solid particles, usually 1 μm and below, in the backgliding, dicing, and slicing processes. They mingle in washing water, and are discharged as they are. In view of recovering valuable silicon material, recycling or treating waste waters, it is of course necessary to separate them from water.

Hitherto, as for the separation of fine solid particles from waste solution, two systems are well known, and have been adopted: one a batch system, which comprises: feeding a certain amount of solution to a separator equipped with selective permeable membrane batchwise to separate water and solid particles by using the permeable action of the membrane, and feeding back the solution thus becoming concentrated with solid particles to feed again to the separator, and the other a continuous system, which additionally includes discharging part of solution concentrated with particles in a continuous manner.

According to such liquid-solid particle separation process employing only selective permeable membrane, it is certainly possible to have good working efficiency in the early stage by increasing the flux; it is because the solution is not still concentrated with particles. But as the concentration of particles reaches high level (usually 10,000 ppm or more) in solution, particles begin to stick to the selective permeable membrane so rapidly that they soon develop into aggregation there and eventually choke it as much as deteriorating the flowability of the solution. In consequence, not only does the separating capacity of the membrane decline but also there increasingly thrives a micro-organism on it.

In the meantime, other than the separation process using selective permeable membrane, the centrifugal process is well known, which is usually used to separate suspending 1–10 μm particles from solution. If, however, this process would be applied to the separation of particles of submicron orders, it is difficult to have good result from it, because those particles have so too large specific surface area in proportion to their weight that they hardly precipitate due to the resistance with liquid (water), although it is effective when they tend to aggregate.

As stated above, as far as solution containing fine particles of submicron orders is concerned, the separation process by means of membrane is very effective in the early stage of separation where the particle aggregation is not so remarkable, contrary to the centrifugal separation, which is effective in the separation of aggregated particles.

Like this, the separation process by means of membrane and the separation process by means of centrifuge are contrary to each other in effectiveness according to the size of particles concerned.

SUMMARY OF THE INVENTION

Accordingly, it is an object of this invention to provide a process capable of separating solid particles of submicron orders from liquid in solution extending many hours without deteriorating the permeability of membrane by combining respective merits of the two separation processes mentioned above.

The object of this invention can be accomplished by a liquid-solid particle separation process, characterized by comprising: repeating feeding waste solution containing fine solid particles to a membrane-type separator and feeding at least part of said solution concentrated with particles therefrom back to said membrane-type separator on one hand while providing said concentrated solution to a centrifugal separator on the other.

DETAILED DESCRIPTION OF THE INVENTION

Solutions to be provided to the process of this invention usually contain fine solid particles of submicron orders not more than 1 μm in size. They may be cooling water, or waste water from the back-gliding, dicing, rapping, polishing or slicing process of silicon wafers, gallium-arsenic wafers or the like, or from the synthesizing process of ceramics, for example. Employed as the membrane-type separator of this invention are an ultrafiltration apparatus, reverse osmosis apparatus, and microfiltration apparatus. Also, various polymers, such as polysulfonates, polyolefins, cellulose acetates, ethylene-vinylalcohol copolymer, polyvinylalcohol, polyacrylonitrile, polyamide, and the like can be used for selective permeable membrane.

As for the membrane-type separator, any separator provided with hollow fiber membrane, tubular membrane, spiral membrane, and flat membrane can be used similarly. Moreover, cylinder type (for example, Sharles system), separatable plate type (for example, De laval system), and inclination type (for example, Deconter system) separators can be used similarly as the centrifugal separator of this invention.

Figure 1:
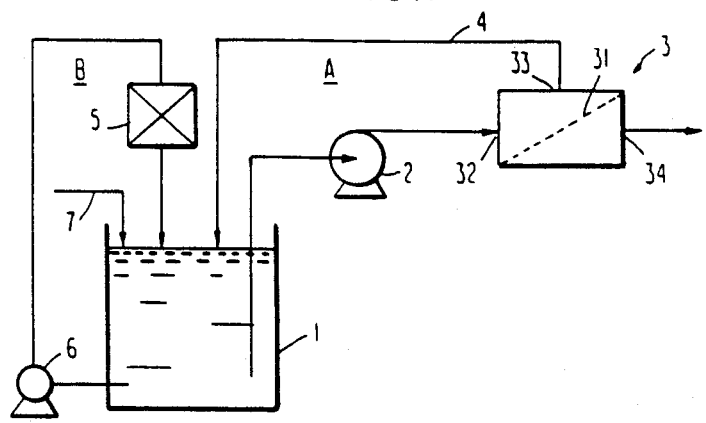
FIGS. 1, 2, and 3 are a schematic illustration showing a liquid-solid particle separation system according to this invention.

FIG. 1 shows a liquid-solid particle separation system of this invention, in which 1 denotes a tank for storing solution to be treated; 2 denotes a pump for feeding the solution; 3 denotes a membrane-type separator; 4 dentoes a pipe for feeding the solution concentrated with particles back to the tank 1; 5 denotes a centrifugal separator; 6 denotes a pump; 7 denotes a pipe for introducing the solution in the tank; 31 denotes selective permeable membrane; 32 denotes an inlet for the solution; 33 denotes an outlet for the solution; and 34 denotes an outlet for permeate.

The solution to be treated, which contains solid particles of submicron orders, is put in the tank 1 by way of the pipe 7. The pump 2 provides the solution to the membrane separator 3. Liquid, for example water, in the solution passes through the selective permeable membrane 31, and flows out from the outlet 34 as permeate.

The concentration of particles increases as water flows out through the membrane 31. The solution thus concentrated with solid particles is returned to the tank 1. In this way, the untreated solution is allowed to circulate along route A that comprises the tank 1, the membrane separator 3, and the tank 1; and as the solution circulates route A, the concentration of particles increases more and more.

According to this invention, however, part of the solution, becoming more and more concentrated with particles, is allowed to circulate along route B as well, which contains the centrifugal separator 5. Therefore, aggregated large-size particles can be separated from liquid so effectively by the centrifugal separator 5 that the concentration of particles in the solution in route A can remain so low as to avoid their excessive sticking to the membrane 31, whereby the permeability of the membrane of the separator 3 can always be kept as high as almost in its early condition.

In the meantime, such sludge containing plenty of solid particles can be recovered by the centrifugal separator that precious materials can be recovered effectively.

Figure 2:
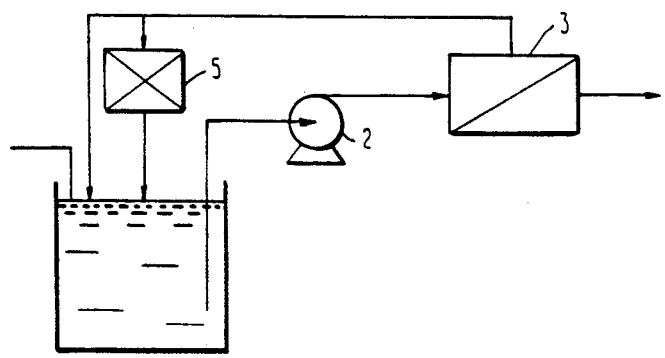
Figure 3:
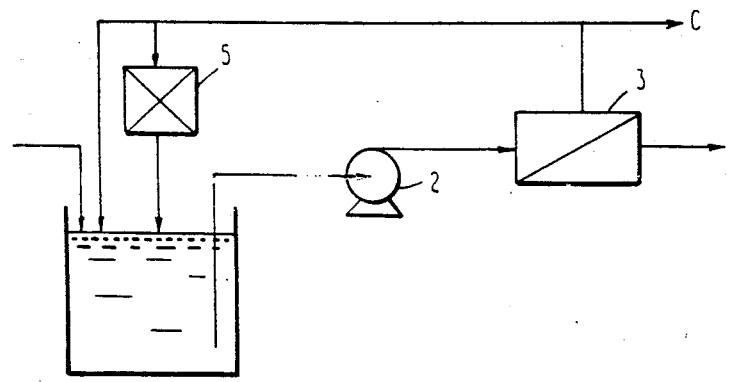

In the above, the centrifugal separator 5 may be got into operation with the membrane-type separator 3 stopping. Also, both the separators 3, 5 may be got into operation concurrently. The pump 6 for the centrifugal separator 5 may be omitted as shown in FIGS. 2 and 3, in return for that the pump 2 is used for both the separators. Furthermore, part of the concentrated solution may be discharged continuously as shown by arrow-headed line C in FIG. 3.

As stated above, according to this invention, the permeability of the membrane can be kept almost as good as in the beginning of filtering operation; thus, liquid in untreated solution can pass through the membrane very well and the permeate can be obtained effectively. In consequence, fine solid particles can be recovered by a centrifugal separator so much that precious materials can be recovered effectively.

EXAMPLE

An ultrafiltration apparatus equipped with hollow polysulfonate sulfonate fiber membrane, product type NTU-3250 of Nitto Denko Corporation, and a cylindrical centrifugal separator, product type TSK-50 of Toto Separator Kogyo Kabushiki Kaisha, were arranged in combination as shown in FIG. 1. Waste water from the silicon wafer polishing process, which contains 80 ppm of submicron silicon particles of 1 $\mu$m and below, was put in a storing tank at the rate 25 liter a minute and fed to the ultrafiltration apparatus under a pressure of 2.5 kg·f/cm$^2$.

When the cylindrical centrifugal separator was used in association with the ultrafiltration apparatus, the flux through the hollow polysulfonate fiber membrane was 300 liter/m$^2$·hour at the start of operation and 250 liter/m$^2$·hour, 1000 hours thereafter. Like this, the drop in the permeability of the membrane was slight.

COMPARATIVE EXAMPLE

When the cylindrical centrifugal separator was not used in association with the ultrafiltration apparatus in the same operation, the flux through the same membrane widely fell to 20 liter/m$^2$ hour, 500 hours after the start of the operation.

What is claimed is:

1. A liquid-solid particle separation process, comprising the steps of:
    repeatedly feeding waste solution containing fine solid particles to a membrane-type separator; and
    feeding at least part of said solution concentrated with particles therefrom back to said membrane-type separator on one hand while providing said concentrated solution to a centrifugal separator on the other.

2. A liquid-solid separation process according to claim 1, wherein said fine solid particles are from 1-10 microns in size.

3. A liquid-solid separation process according to claim 1, wherein said fine solid particles are less than 1 micron in size.

4. A liquid-solid separation process according to claim 1, wherein said fine solid particles result from processing silicon, gallium arsenic, or ceramic.

* * * * *